United States Patent
Clayton et al.

(10) Patent No.: US 12,094,014 B2
(45) Date of Patent: Sep. 17, 2024

(54) COMPUTER SYSTEMS AND METHODS FOR DYNAMIC PULL PLANNING

(71) Applicant: Procore Technologies, Inc., Carpinteria, CA (US)

(72) Inventors: Julian Clayton, Milford, CT (US); Navin Kaminoulu, Toronto (CA); Mohammad Mostafa Soltani, Toronto (CA); Matt Man, Toronto (CA)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 17/730,821

(22) Filed: Apr. 27, 2022

(65) Prior Publication Data
US 2023/0351530 A1 Nov. 2, 2023

(51) Int. Cl.
*G06Q 50/08* (2012.01)
*G06Q 10/0631* (2023.01)

(52) U.S. Cl.
CPC ..... *G06Q 50/08* (2013.01); *G06Q 10/063116* (2013.01); *G06Q 10/063118* (2013.01)

(58) Field of Classification Search
CPC ........................ G06Q 50/08; G06Q 10/063116
See application file for complete search history.

(56) References Cited

U.S. PATENT DOCUMENTS

| | | | |
|---|---|---|---|
| 6,571,215 B1 * | 5/2003 | Mahapatro | G06Q 10/0631 707/999.01 |
| 9,424,545 B1 * | 8/2016 | Lee | G06Q 10/063114 |
| 2003/0149717 A1 * | 8/2003 | Heinzman | G06F 9/5038 718/101 |

(Continued)

FOREIGN PATENT DOCUMENTS

| | | |
|---|---|---|
| WO | 2020/163891 A1 | 8/2020 |
| WO | 2022/026520 A1 | 2/2022 |

OTHER PUBLICATIONS

Fitzsimmons et al, Construction Schedule Risk Analysis—A Hybrid Machine Learning Approach, Journal of Information Technology in Construction (ITcon), vol. 27, p. 70-93 (Year: 2022).*
Amer et al, Transformer machine learning language model for auto-alignment of long-term and short-term plans in construction, Automation in Construction 132 (2021) 103929 (Year: 2021).*

(Continued)

*Primary Examiner* — Andre D Boyce
(74) *Attorney, Agent, or Firm* — Lee Sullivan Shea & Smith LLP

(57) ABSTRACT

A computing system is configured to determine an update to a master schedule for a construction project that comprises a plurality of tasks, each task comprising a respective scheduled start date; execute a machine learning model that has been trained with historical construction project schedule data and thereby identify one or more tasks that is each a candidate for commencement earlier than its scheduled start date; cause a client station to display each identified task, its scheduled start date, a respective new start date, and an impact on the master schedule if the task is commenced on the respective new start date; receive user input indicating a selection of a given task that is to be commenced earlier than its scheduled start date; and cause a notification to be transmitted to a party responsible for completing the given task indicating that the given task has been nominated for earlier commencement and requests approval for earlier commencement.

20 Claims, 4 Drawing Sheets

(56) References Cited

U.S. PATENT DOCUMENTS

| | | | | |
|---|---|---|---|---|
| 2005/0278208 | A1* | 12/2005 | Schultz | G06Q 10/06 |
| | | | | 705/7.12 |
| 2006/0100728 | A1* | 5/2006 | Brown | G06Q 10/04 |
| | | | | 700/100 |
| 2012/0215574 | A1* | 8/2012 | Driessnack | G06Q 10/0639 |
| | | | | 705/7.12 |
| 2016/0132804 | A1* | 5/2016 | Croft | G06Q 10/06313 |
| | | | | 705/7.23 |
| 2019/0325089 | A1* | 10/2019 | Golparvar-Fard | G06T 19/003 |
| 2019/0377602 | A1 | 12/2019 | Mosca | |
| 2020/0019907 | A1* | 1/2020 | Notani | G06Q 10/063116 |
| 2020/0210965 | A1* | 7/2020 | Garber | G06Q 10/06315 |
| 2020/0410424 | A1 | 12/2020 | Bellaish et al. | |
| 2021/0287177 | A1* | 9/2021 | Musialek | G06Q 10/06312 |
| 2023/0153716 | A1* | 5/2023 | Kumar | G06Q 10/06312 |
| | | | | 705/7.22 |

OTHER PUBLICATIONS

International Searching Authority, PCT International Search Report and Written Opinion, PCT International Application No. PCT/US2023/020212, dated Aug. 16, 2023, 9 pages.

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

\* cited by examiner

COMPUTER SYSTEMS AND METHODS FOR DYNAMIC PULL PLANNING

BACKGROUND

Construction projects can be massive endeavors involving multiple different parties that need to collaborate throughout the course of the construction project on many different aspects. For instance, there may be a developer who is funding the project (e.g., a project owner), a general contractor ("GC") who manages the overall construction project, and numerous subcontractors (e.g., specialty trades contractors, vendors, suppliers, etc.) who provide goods and/or services to the GC to complete the project. Typically, a project owner may enter into a "prime contract" with a GC that defines the overall scope of the work to be performed on the construction project and the fees that the project owner will pay to the GC in connection with that work. In turn, a GC may enter into various subcontracts with different subcontractors to work on different aspects of the construction project (e.g., a first subcontractor for concrete work, a second subcontractor for carpentry work, a third subcontractor for electrical work, etc.), where each such subcontract defines the scope of work to be performed by a subcontractor pursuant to the subcontract and the fees that the GC will pay to the subcontractor in connection with that work. Thus, the prime contract and the various subcontracts collectively define the work that must be done in order to complete the construction project, the agreed-upon costs (e.g., one or more Schedule of Values) for the work, and a master schedule that lays out a timeline for the work to be completed, including the construction project's major milestones, key deliverables, and their corresponding start and end dates.

The master schedule is typically a high-level schedule and does not include detailed scheduling information regarding individual work activities, tasks, resources, labor, vendors etc. Such detailed scheduling information is determined progressively in smaller segments as part of "look-ahead" scheduling implemented throughout the course of the construction project whereby certain project stakeholders (e.g., superintendents, general contractors, subcontractors, and/or other construction professionals involved on the construction project) determine detailed schedules for an upcoming given period of time (e.g., four weeks, six weeks, etc.). As part of look-ahead scheduling, project stakeholders typically engage in "pull planning," which is a collaborative process by which the work that is to be completed in a look-ahead period of time is evaluated on a granular level to refine start and end dates for individual tasks. In particular, tasks are evaluated to determine if the master schedule can be tightened—or "pulled in"—by identifying tasks that can be commenced and/or completed earlier than previously planned.

This process can be laborious, as it requires all key stakeholders involved in work for a given look-ahead period to congregate and meticulously review each task and related work activity to then determine if any tasks can be "pulled up," or started earlier than a previously-scheduled start date. Stakeholder participation is an imperative part of the pull planning process because the stakeholders have access to the best knowledge about available resources and requirements for tasks in their purview and critical insight about the feasibility of pulling up those tasks.

Typically, tasks are reviewed in reverse chronological order. In other words, stakeholders will begin with a final milestone for the look-ahead period and work backwards to determine all of the tasks that must be completed to achieve that milestone and in which order those tasks should be completed. This helps identify task dependencies, and the project stakeholders can determine how to re-distribute resources and/or revise start and end dates for certain tasks in order to pull in the master schedule. Pull planning sessions typically involve manually re-working the look-ahead schedule by labeling adhesive notes (e.g., Post-it® Notes) with individual tasks and/or work activities and then iteratively restructuring the notes on a wall or display board based on evaluating timing and dependency information for performing those tasks and/or work activities, available resources, materials, site conditions, among other factors. When the restructuring of tasks in the look-ahead period is finalized, the master schedule is then updated based on tasks that have been identified to be pulled up, and based on how work for those tasks actually progresses.

In practice, pull planning sessions are performed regularly based on the needs of a construction project, which may be on a monthly, bi-weekly, weekly, or perhaps even a daily basis. However, productive pull planning sessions can be challenging to achieve. As an initial matter, scheduling a pull planning session in itself is often onerous because coordinating availability of relevant stakeholders for a given look-ahead period to determine a time to conduct the pull planning session can be difficult. Further, due to their many other project commitments, stakeholders often have insufficient time to adequately prepare for pull planning sessions, which often results in unresolved scheduling items. Still further, during the process of pull planning, it may be determined that input from one or more additional stakeholders (e.g. based on identifying task dependencies) and/or additional information (e.g., an outstanding Request for Information (RFI), etc.) is required, and the session may need to be paused and resumed at a later time when the additional stakeholder(s) and/or additional information is available. Further yet, because pull planning typically involves the iterative placement, movement, and replacement of adhesive notes during a pull planning session, it is unfortunately easy to lose progress (e.g., if someone inadvertently brushes against the notes and causes them to become displaced), which is not an infrequent occurrence. This can result in mass frustration, disruption to scheduling progress, and a loss of time and effort spent planning.

OVERVIEW

In an effort to alleviate some of the challenges associated with developing and managing schedules associated with a construction project, including look-ahead scheduling and pull planning, software technology has been developed to digitize scheduling and enable user coordination and communication with respect to project schedules. For instance, Procore Technologies, Inc. ("Procore"), who is the assignee of the present application, offers a construction management software application that includes various software tools that facilitate management of different aspects of scheduling related to a construction project, including software tools that help facilitate managing a master schedule for the construction project. For example, such software tools may enable users to create and collaborate on look-ahead schedules. Further, such software tools may enable integration of third party schedules (e.g., schedules created using third party tools such as Microsoft Project, Primavera, etc.) with various construction management tools available within Procore's software application. Still further, such software tools may enable customizable viewing, searching, and filtering of schedule information.

While this existing software technology for managing construction project schedules provides benefits to construction professionals involved in managing and updating project schedules, such as enabling digitized scheduling, it still presents some drawbacks.

As one example, the existing software technology for managing construction project schedules fails to address the burden on users to manually monitor a master schedule for a construction project and determine when scheduling updates are required (e.g., when project tasks are completed, etc.). This exposes the master schedule to the risk of missed schedule updates and/or updates that are identified in a delayed manner, which can result in delays to the master schedule and progression of work for the construction project, and increased project costs. As another example, the existing software technology for managing construction project schedules fails to address the burden on users (e.g., stakeholders) to actively participate in the pull planning process to define relationships and dependencies between different tasks and work activities, identify work (e.g., project tasks, work activities, etc.) that can potentially be pulled up, work with parties responsible for the identified work to get approval for earlier commencement of the identified work that can be pulled up, and then execute earlier commencement of the approved work. This exposes the pull planning process to the risk of failing to accurately determine inter-task dependencies and consequent failure to timely identify work that is available to be pulled up, which in turn can introduce delays to the master schedule and/or missed opportunities to pull in the master schedule in one or more ways. This in turn may result in increased project costs, thus causing the construction project to go over budget or run behind schedule.

To help address these and other problems, disclosed herein is new software technology that improves upon existing solutions for managing schedules for a construction project.

As will be described in detail further below, the disclosed software technology includes various aspects, which may be implemented either individually or in combination. For instance, the disclosed software technology may include one or more software engines or sub-engines that may run independently of each other and at different times, or may run in conjunction with one another, such as in instances where an output of one software engine or sub-engine forms part of an input for another software engine or sub-engine. Other examples are also possible.

In one aspect, the disclosed software technology comprises a software engine that functions to apply predictive analytics to data defining a master schedule that has been created for a construction project in order to determine if one or more tasks for the construction project can be commenced earlier than their respective scheduled dates. In another aspect, the disclosed software technology comprises a software tool for managing schedules for a construction project that enables users to interact with tasks identified by the software engine for commencement earlier than scheduled and facilitate approval and coordination of earlier commencement of the identified tasks.

The software engine, which may be referred to herein as a "pull planning" software engine, may function to (i) receive, as input, an update to a master schedule for a construction project and (ii) output at least one task that can be commenced earlier than a scheduled start date based on the update to the master schedule. At its core, the pull planning software engine may comprise program code that functions to apply predictive analytics to data defining a master schedule for a construction project in order to determine whether one or more future-scheduled tasks having respective scheduled start dates can be commenced earlier than their scheduled start dates based on the received input comprising an update to the data defining the master schedule. Additionally, the software engine may optionally include program code that functions to pre-process, using techniques such as Natural Language Processing (NLP) techniques or the like, the received input and perhaps also other data for the construction project. Additionally still, the software engine may include program code that functions to evaluate the received, and perhaps pre-processed, input and yield an output that comprises an identification of at least one task that can be "pulled up," or commenced earlier than its respective scheduled start date. Additionally yet, the software engine may include program code that runs when a task that can be commenced earlier than its respective scheduled start date is identified and functions to determine certain information related to the identified task, such as a recommended new start date for the identified task and an impact and on the master schedule if the task is commenced on the new start date instead of its scheduled start date. In this regard, the yielded output may additionally include one or more of (i) a recommended new start date, (ii) a predicted impact on the master schedule if the at least one identified task is commenced on the new start date instead of the scheduled start date, or (iii) information about a party responsible for the at least one identified task.

Further, the predictive analytics that are utilized by the software engine to determine whether any tasks can be commenced earlier may take any of various forms. In general, the predictive analytics may utilize a machine learning model that is trained using one or more machine learning techniques (including but not limited to artificial and/or recurrent neural networks, regression, and/or clustering, etc.). As one possibility, the predictive analytics sub-engine 304B may comprise a long short term memory (LSTM) model that is trained using a recurrent neural network machine learning technique and functions to (1) receive, as input, historical construction schedule data comprising (i) historical schedule updates comprising completion of a project task, and perhaps also (ii) data about any contributing factors that led to the updates, (iii) dependency data for the project task (e.g., one or more tasks that are dependent upon the project task), along with (iv) a set of general scheduling rules, (2) evaluate the received data and other available data for the construction project, and perhaps also (3) output one or more recommended updates to the master schedule. The historical construction project schedule data that is provided as input for training the machine learning model may include data related to tasks from numerous construction projects, and may be provided to the machine learning model on an ongoing basis as the construction projects progress. Further, the historical construction project schedule data may include various types of data, including task status data, task completion data, other project data associated with a task.

The pull planning software engine may utilize other types of predictive analytics and other types of training techniques as well.

Further yet, the software engine may be run at various times. As one possibility, the pull planning software engine may be run each time an update to the master schedule is made. As another possibility, the software engine may be run each time certain type of data for the construction project is received (e.g., observation data, image data, audiovisual data, RFI data, project phase data, etc.) by a back-end computing platform running the pull planning software engine. Still, as another possibility, the pull planning software engine may be run according to some predefined interval. As yet another possibility, the pull planning software engine may be run each time a certain type of user input is detected. Still, as another possibility, the timing of running the pull planning software engine may depend on user information (e.g., user type, user permissions, etc.). The pull planning software engine may be run at other times as well.

Based on the output of the pull planning software engine, the back-end computing platform running the pull planning software engine may perform certain actions. As one possibility, the back-end computing platform may cause the outputted data to be displayed to a user in the form of a recommendation. In this regard, the back-end computing platform may cause the recommendation to be displayed to the user via a GUI of the software application incorporating the disclosed software technology and being run by the back-end computing platform that is presented to the user at a client station configured to communicate with the back-end computing platform. The recommendation that is presented to the user may comprise (1) an identification of one or more tasks that can be commenced earlier than their respective start dates and (2) for each identified task, (i) an indication of its scheduled start date, (ii) an indication of a new start date that is earlier than the scheduled start date, and (iii) an indication of an impact on the master schedule if the identified task is commenced on the new start date instead of its scheduled start date.

The recommendation that is presented to the user may enable the user to provide user input, which may include, as some examples, a selection of an identified task that is to be nominated for earlier commencement, an update to a new start date for an identified task, or an indication of whether two or more selected identified tasks are to be nominated for individual approval or for packaged approval, among other possibilities. The user input may be provided to the back-end computing platform in the form of data defining the user input.

Based on receiving the data defining the user input, the back-end computing platform may take various actions to facilitate approval of each identified task that was nominated for earlier commencement, which may involve transmitting, to a party responsible for completing the identified task, a notification that (i) indicates that the identified task has been nominated for commencement earlier than its scheduled start date, perhaps along with an indication of a new start date, and (ii) requests approval from the responsible party for earlier commencement of the identified task on the new start date. The notification may take various forms, including an email communication, a chat message, a text message, or an alert that is displayed at a GUI view of the software application, among other possibilities.

Depending on whether or not a request to approve earlier commencement of a given task is accepted or denied, the back-end computing platform may take various actions. For example, if the back-end computing platform receives data indicating that the request has been approved, the back-end computing platform may update the master schedule to reflect earlier commencement of the given task and may perhaps also cause a notification regarding the approval to be sent to the user that nominated the given task for earlier commencement. As another example, if the back-end computing platform receives data indicating that the request has been denied, the back-end computing platform may not update the master schedule and may perhaps also cause a notification regarding the denial to be sent to the user that nominated the given task for earlier commencement. The back-end computing platform may take various other actions as well.

Accordingly, in one aspect, disclosed herein is a method that involves a computing system (i) determining an update to a master schedule for a construction project, wherein the master schedule comprises a plurality of tasks, each task comprising a respective scheduled start date; (2) based on the update to the master schedule, executing a machine learning model that has been trained with historical construction project schedule data comprising historical schedule updates and thereby identify one or more tasks for the construction project that is each a candidate for commencement earlier than its scheduled start date; (3) causing a client station associated with a user to display: the one or more identified tasks; and for each identified task, (i) its scheduled start date, (ii) a respective new start date that is earlier than the scheduled start date, and (iii) an impact on the master schedule if the task is commenced on the respective new start date instead of its scheduled start date; (4) receiving user input indicating a selection of a given task that is to be commenced earlier than its scheduled start date; and (5) based on the user input, causing a notification to be transmitted to a party responsible for completing the given task, wherein the notification (i) indicates that the given task has been nominated for commencement earlier than its scheduled start date and (ii) requests approval for earlier commencement of the given task on the new start date.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable storage medium having program instructions stored thereon that are executable to cause a computing system to carry out the functions disclosed herein, including but not limited to the functions of the foregoing method.

One of ordinary skill in the art will appreciate these as well as numerous other aspects in reading the following disclosure.

Figure 1:
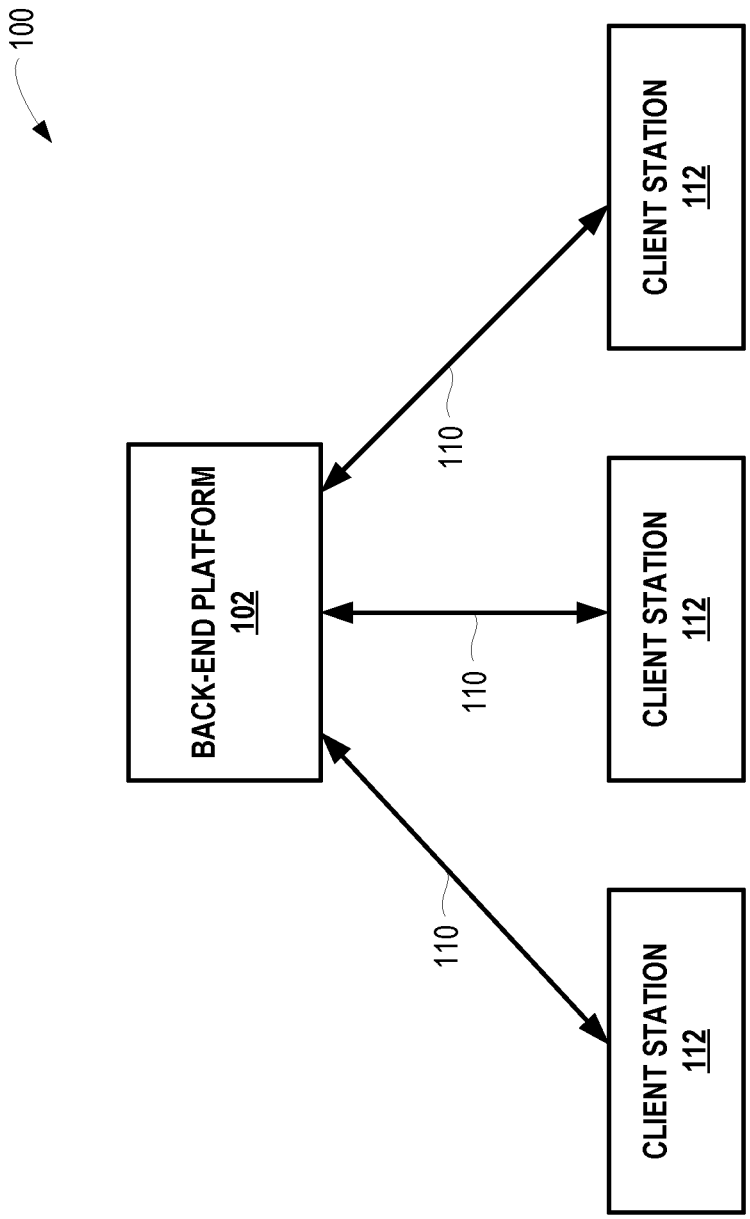
FIG. 1 depicts an example network configuration in which example embodiments may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example System Configuration

The present disclosure is generally directed to software technology for managing project schedules. At a high level, the disclosed software technology may function to (i) apply predictive analytics to data for a master schedule created for a construction project in order to identify whether any tasks for the construction project can be commenced earlier than scheduled, (ii) presenting, to a user, any identified tasks that can be commenced earlier than scheduled, and (iii) facilitating coordination of earlier commencement for the identified tasks, among various other functions that are performed by the disclosed software technology and are described in further detail below. This disclosed software technology may be incorporated into one or more software applications that may take any of various forms.

As one possible implementation, this software technology may be incorporated into a software as a service ("SaaS") application that includes both front-end software running on one or more client stations that are accessible to individuals associated with construction projects (e.g., contractors, subcontractors, project managers, architects, engineers, designers, etc., each of which may be referred to generally herein as a "construction professional") and back-end software running on a back-end computing platform (sometimes referred to as a "cloud" platform) that interacts with and/or drives the front-end software, and which may be operated (either directly or indirectly) by the provider of the front-end software. As another possible implementation, this software technology may be incorporated into a software application that takes the form of front-end client software running on one or more client stations without interaction with a back-end computing platform. The software technology disclosed herein may be incorporated into software applications that take other forms as well. Further, such front-end client software may take various forms, examples of which may include a native application (e.g., a mobile application), a web application running on a client station, and/or a hybrid application, among other possibilities.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as client stations 112.

Broadly speaking, back-end computing platform 102 may comprise one or more computing systems that have been provisioned with software for carrying out one or more of the functions disclosed herein, including but not limited to functions related to receiving and evaluating project data, causing information to be displayed via a front-end interface (e.g., a graphical user interface (GUI)) through which the data is presented on the one or more client stations, and facilitating changes to project data. The one or more computing systems of back-end computing platform 102 may take various forms and be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS) or the like. As another possibility, back-end computing platform 102 may comprise one or more dedicated servers that have been provisioned with software for carrying out one or more of the functions disclosed herein. Other implementations of back-end computing platform 102 are possible as well.

In turn, client stations 112 may each be any computing device that is capable of running the front-end software disclosed herein. In this respect, client stations 112 may each include hardware components such as a processor, data storage, a communication interface, and user-interface components (or interfaces for connecting thereto), among other possible hardware components, as well as software components that facilitate the client station's ability to run the front-end software incorporating the features disclosed herein (e.g., operating system software, web browser software, mobile applications, etc.). As representative examples, client stations 112 may each take the form of a desktop computer, a laptop, a netbook, a tablet, a smartphone, and/or a personal digital assistant (PDA), among other possibilities.

As further depicted in FIG. 1, back-end computing platform 102 may be configured to interact with client stations 112 over respective communication paths 110. In this respect, each communication path 110 between back-end computing platform 102 and one of client stations 112 may generally comprise one or more communication networks and/or communications links, which may take any of various forms. For instance, each respective communication path 110 with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 110 with back-end computing platform 102 may be wireless, wired, or some combination thereof, and may carry data according to any of various different communication protocols. Although not shown, the respective communication paths 110 between client stations 112 and back-end computing platform 102 may also include one or more intermediate systems. For example, it is possible that back-end computing platform 102 may communicate with a given client station 112 via one or more intermediary systems, such as a host server (not shown). Many other configurations are also possible.

While FIG. 1 shows an arrangement in which three particular client stations are communicatively coupled to back-end platform 102, it should be understood that this is merely for purposes of illustration and that any number of client stations may communicate with back-end platform 102.

Although not shown in FIG. 1, back-end computing platform 102 may also be configured to receive data, such as data related to a construction project, from one or more external data sources, such as an external database and/or another back-end computing platform or platforms. Such data sources—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. Example Computing Platform

Figure 2:
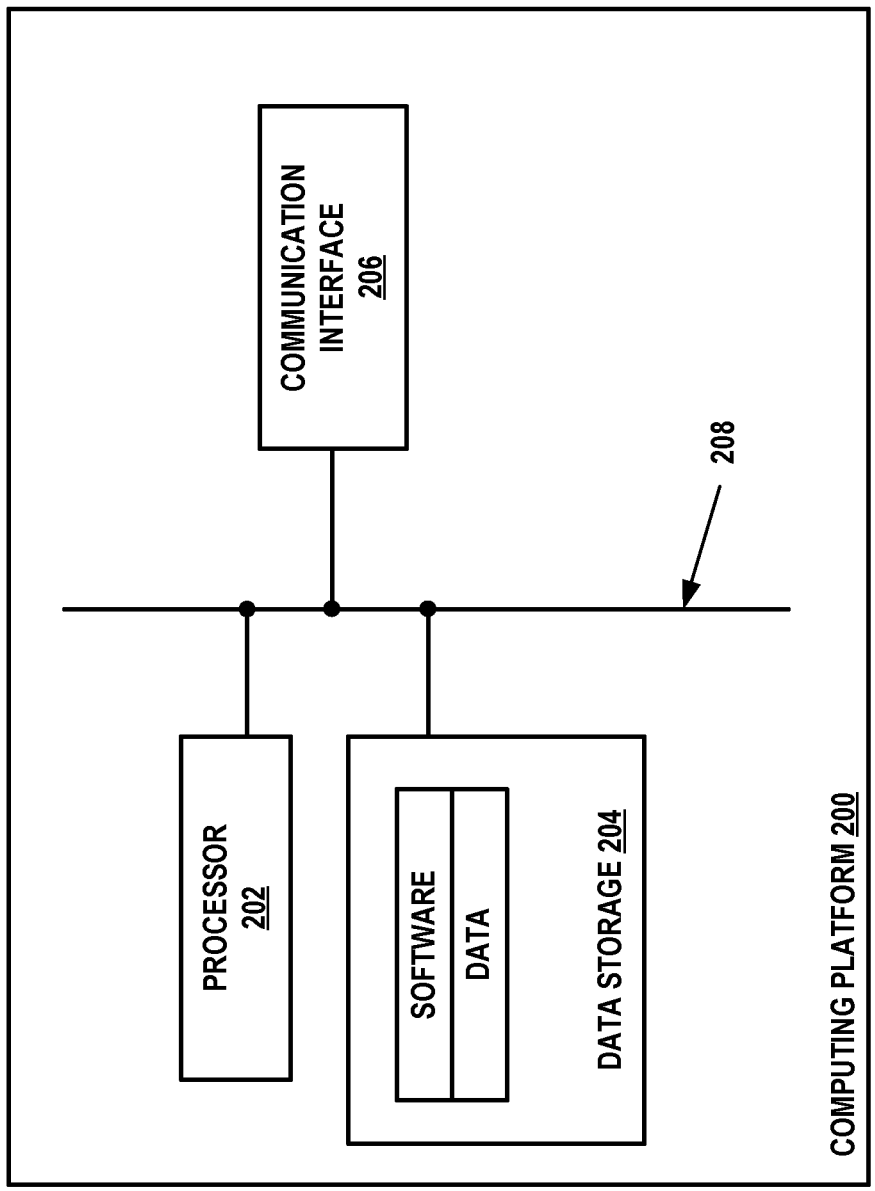
FIG. 2 depicts an example computing platform that may be configured to carry out one or more of the functions according to the disclosed software technology.

FIG. 2 is a simplified block diagram illustrating some structural components that may be included in an example computing platform 200, which could serve as, for instance, the back-end computing platform 102 of FIG. 1. In line with the discussion above, computing platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that computing platform 200 is configured to perform some or all of the functions disclosed herein, which may be arranged together into software applications, virtual machines, software development kits, toolsets, or the like, and (ii) data that may be received, derived, or otherwise stored, for example, in one or more databases, file systems, or the like, by computing platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with external data sources and/or client stations, such as one or more client stations 112 of FIG. 1. Additionally, in an implementation where computing platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may facilitate communications according to any of various communications protocols, examples of which may include Ethernet, Wi-Fi, cellular network, serial bus (e.g., Firewire, USB 3.0, etc.), short-range wireless protocols, and/or any other communication protocol that provides for wireless and/or wired communication. Communication interface 206 may also include multiple communication interfaces of different types. Other configurations are possible as well.

Although not shown, computing platform 200 may additionally include or have one or more interfaces for connecting to user-interface components that facilitate user interaction with computing platform 200, such as a keyboard, a mouse, a trackpad, a display screen, a touch-sensitive interface, a stylus, a virtual-reality headset, and/or speakers, among other possibilities, which may allow for direct user interaction with computing platform 200. Further, although not shown, a client station, such as one or more of the client stations 112, may include similar components to the computing platform 200, such as a processor, a data storage, and a communication interface. Further, the client station may also include or be connected to a device, such as a smartphone, a laptop, a tablet, or a desktop, among other possibilities, that includes integrated user interface equipment, such as a keyboard, a mouse, a trackpad, a display screen, a touch-sensitive interface, a stylus, a virtual-reality headset, speakers, etc., which may allow for direct user interaction with computing platform 200.

It should be understood that computing platform 200 is one example of a computing platform that may be used with the embodiments described herein. Numerous other arrangements are possible and contemplated herein. For instance, other computing platforms may include additional components not pictured and/or more or fewer of the pictured components.

III. Example Operations

As mentioned above, disclosed herein is new software technology that improves upon existing software technology for managing master schedules for construction projects. The disclosed software technology comprises various aspects that may be implemented either individually or in combination, which will now be described in further detail. Further, in practice, the disclosed software technology may be incorporated into any software application that facilitates schedule management for a construction project, including but not limited to construction management software applications. Moreover, the disclosed software technology may be actuated by a back-end computing platform, such as the computing platform 200, that is configured to run the software application which incorporates the disclosed software technology.

a. Pull Planning Software Engine

According to a first aspect, the disclosed software technology comprises a software engine that functions to apply predictive analytics to a master schedule that has been created for a construction project in order to determine if one or more tasks for the construction project can be commenced earlier than their respective scheduled dates. For instance, after receiving data defining an update to a master schedule for a construction project that indicates completion of a given project task, the software engine may function to apply predictive analytics to data defining the master schedule to identify those tasks of the construction project that can be commenced earlier than scheduled based on completion of the given project task.

Figure 3:
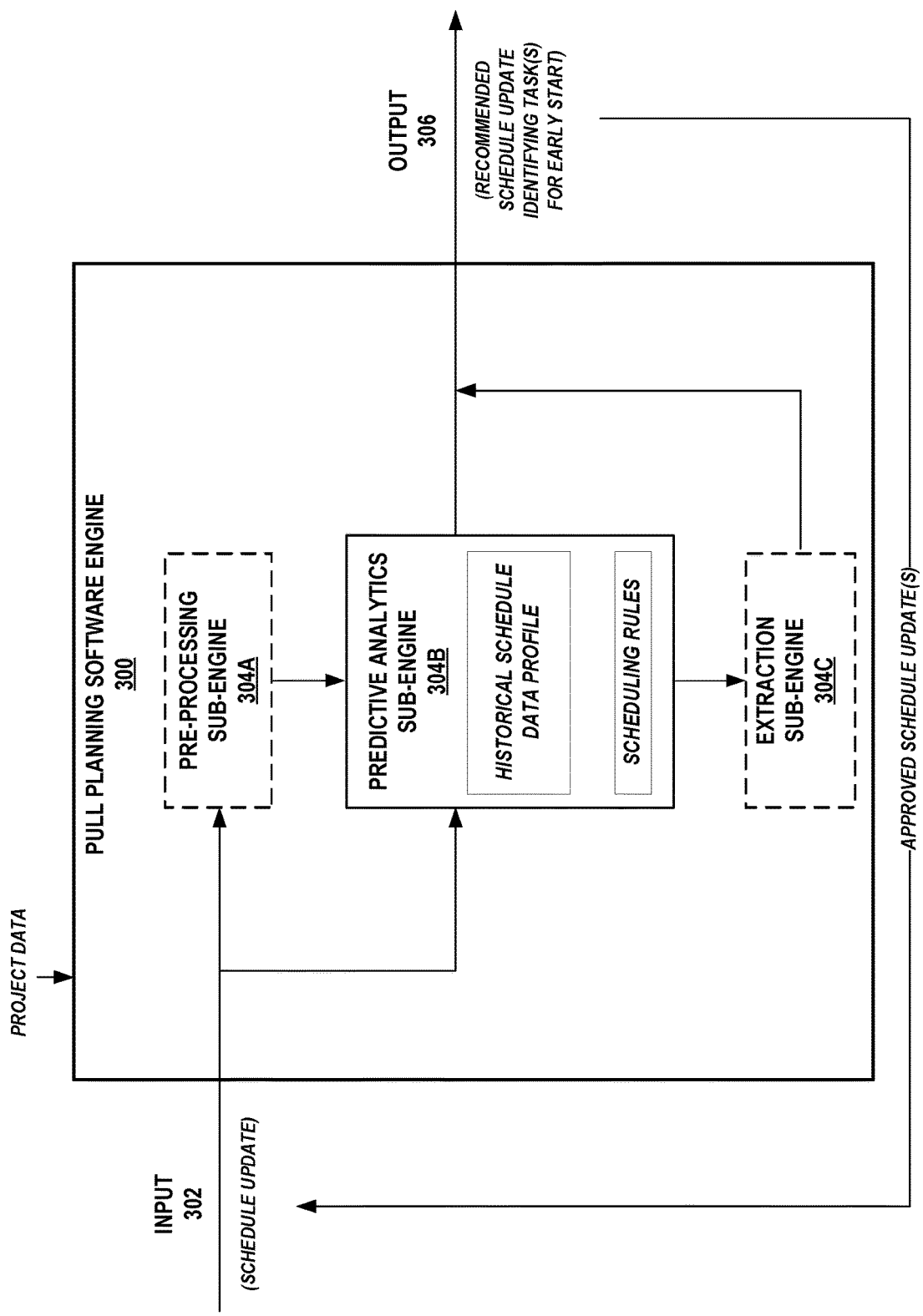
FIG. 3 depicts an example of a software engine that is configured to identify tasks of a construction project that can be commenced earlier than scheduled.

With reference now to FIG. 3, one possible example configuration of a software engine as disclosed herein is illustrated. The example pull planning software engine 300 may function to (i) receive, as input 302, an update to a master schedule for a construction project and (ii) output at least one task that can be commenced earlier than a scheduled start date based on the update to the master schedule.

In some examples, the input 302 may comprise data defining the update to the master schedule for the construction project based on a user input that is provided via a GUI for managing and/or updating the master schedule. For instance, a back-end computing platform, such as the computing platform 200, that is responsible for running a software application incorporating the disclosed technology including the example pull planning engine 300 may cause a client station associated with a user (e.g., one of the client stations 112) to display the GUI for managing the master schedule. In practice, the GUI for managing the master schedule may be accessed by the user launching the software application (e.g., a mobile version of the application or a web-based version of the application, etc.) via the client station, which may be configured to communicate with the back-end computing platform. The user may then navigate to a GUI view that enables updating the master schedule and update the master schedule by providing a user input indicating that a given task of the construction project has been completed. Based on the user input, the client station may then transmit to the back-end computing platform data defining the update to the master schedule, which may then serve as the input 302 for the pull planning software engine 300.

In other examples, the input 302 may be generated by the back-end computing platform without direct user input, based on an evaluation of available project data. The back-end computing platform may automatically determine updates to the master schedule in various ways, which will be discussed in further detail below.

The data defining the update may take various forms. For instance, the data defining the update may include information about a status of a given task. For example, such information may indicate that the given task has been completed, delayed, rescheduled, etc., among other possibilities. The data defining the update may also include contextual data based on input provided by the user that includes raw text such as notes or comments. Additionally, the data defining the update may also include information about a project phase associated with the given task. For example, such information may indicate that the given task was scheduled during a particular phase of the construction project, such as a concrete-pour phase, a painting phase, or an electrical phase, among other possibilities. Additionally yet, the data defining the update may also include information about a given period of time relative to the master schedule during which the given task was scheduled. For example, such information may indicate a date range during which the given task was scheduled to be completed. Further, the data defining the update may also include a party that was responsible for completing the given task. Other examples are also possible.

The input 302 may then be provided to the pull planning software engine 300 for evaluation. The pull planning software engine 300 may include one or more sub-engines that function to perform various tasks that enable the software engine 300 to evaluate the received input 302 and return the output 306. As one example, the pull planning software engine 300 may include a pre-processing sub-engine 304A, which comprises program code that functions to pre-process data received by the back-end computing platform, such as the input 302. In some implementations, the pre-processing sub-engine 304A may also pre-process other project data received by the back-end computing platform as part of evaluating the input 302. Alternatively, the pull planning software engine 300 may access project data that has been pre-processed by a different software engine of the back-end computing platform. The pre-processing techniques utilized by the pre-processing engine 304A may take various forms. As one example, pre-processing may take the form of Natural Language Processing ("NLP") techniques that analyze user-inputted data in a way that enables the back-end computing platform running the software engine 300 to better "understand" the overall context of the data. Such NLP techniques may include, as some non-limiting examples, identifying and extracting keywords and/or key features from the raw text included in user-inputted data, correcting any spelling and/or grammatical errors, unification, non-ascii character removal, stop word removal, lemmatization, and sentiment analysis. Other examples are also possible.

The pre-processed input 302 may then be provided to the predictive analytics sub-engine 304A, which comprises program code that functions to apply predictive analytics to the input 302 in order to identify any tasks that can be commenced earlier than scheduled based on the update to the master schedule. Alternatively, the input 302 may be provided directly to the predictive analytics sub-engine 304B without applying any pre-processing. As yet another alternative, certain parts of the input 302 may be provided directly to the predictive analytics sub-engine 304B, and certain other parts of the input 302 may be provided first to the pre-processing sub-engine 304A, after which the certain other parts may be passed on to the predictive analytics sub-engine 304B.

Thereafter, the predictive analytics sub-engine 304B may evaluate the input 302 and yield an output 306, which may take various forms. In general, the output of the software engine 300 may comprise data identifying at least one other task of the construction project that can be commenced earlier than a respective scheduled start date. Further, the output may include a recommended new start date for the at least one identified task. Still further, the output may include a predicted impact on the master schedule if the at least one identified task is commenced on the new start date instead of the scheduled start date. Further yet, the output may include information about a party responsible for managing and/or completing the at least one identified task (e.g., the responsible contractor, etc.). The output may take other forms as well.

In some implementations where the pull planning software engine 300 outputs an identification of at least one task that can be commenced earlier than a scheduled start date, the extraction sub-engine 304C may be run. The extraction sub-engine 304C includes program code that functions to determine (e.g., extract, import a copy of, and/or otherwise derive) certain data for potential inclusion in the output 306. Such determined data may include some of the information that is eventually included as part of the output 306, such as the information about the party responsible for managing and/or completing the at least one identified task, among other possibilities. The pull planning software engine 300 may take various other forms as well.

The predictive analytics sub-engine 304B that may be utilized by the software engine 300 to identify tasks that can be commenced earlier than scheduled may take any of various forms. In general, the predictive analytics sub-engine 304B may utilize a machine learning model that is trained using one or more machine learning techniques (including but not limited to artificial and/or recurrent neural networks, regression, and/or clustering, etc.). As one possibility, the predictive analytics sub-engine 304B may comprise a long short term memory (LSTM) model that is trained using a recurrent neural network machine learning technique and functions to (1) receive, as input, historical construction schedule data comprising (i) historical schedule updates comprising completion of a project task, and perhaps also (ii) data about any contributing factors that led to the updates, (iii) dependency data for the project task (e.g., one or more tasks that are dependent upon the project task), along with (iv) a set of general scheduling rules, (2) evaluate the received data and other available data for the construction project, and perhaps also (3) output one or more recommended updates to the master schedule.

The historical construction project schedule data that is provided as input for training the LSTM model may include data from numerous construction projects, and may be provided to the LSTM model on an ongoing basis as the construction projects progress. Further, the historical construction project schedule data may include various types of data. As one possibility, the historical construction project schedule data may comprise data defining updates to respective construction project schedules, each of which may indicate (i) that a given project task of a construction project was completed, (ii) a completion time indicating whether the given was completed on time, ahead of schedule, or behind schedule as compared to a scheduled date defined in the master schedule for the construction project, and (iii) other associated data for the given project task, such as a project phase during which the given project task was to be completed, or a party responsible for managing completion of the given project task, among other examples.

As another possibility, for each given project task, the historical construction project schedule data may include data about any contributing factors that led to the update. Such contributing factors may take any of various forms. Data about contributing factors may comprise one or more data items of the construction project associated with the given project task that were identified as contributing to the completion time of the given task. Such data items may include project data associated with the given project, such as RFI data, submittal data, resource allocation data, project change order data, invoice data, purchase order data, materials data, inspection report data, incident report data, observation data, site condition data including weather information, or work breakdown structure data, request of payment application data, among other possibilities, that was created using one or more other tools of the software application. Such other tools may include, as some non-limiting examples, an RFI tool where a user may enter RFI data items for the construction project to request and/or provide information about given project tasks, an "Inspections" tool where a user may enter inspections data items for the construction project that capture requirements associated with different types of inspections for the construction project (e.g., safety inspection), an "Observations" tool where a user may enter observation data items for the construction project that memorialize observations made during on-site inspections of the construction project, a "Punch Lists" tool where a user may enter punch lists data items for the construction project that memorialize punch items on the construction project, an "Emails" tool where a user may perform basic email functions (e.g., send, reply, forward, etc.) to communicate with one or more parties involved in the construction project, a "Meetings" tool where a user may enter meetings data items that enable the user to manage meetings (e.g., schedule meetings, select attendees, attach reference materials, create meeting agendas, create meeting minutes, etc.), a "Correspondence" tool where a user may enter correspondence data items that enable correspondence with one or more parties regarding certain aspects of the construction project (e.g., status updates, notices of delay, extensions of time, etc.), or an "Instructions" tool where a user may enter instruction data items that memorialize various types of instructions (e.g., architect instructions, site instructions, etc.) for the construction project.

As one example, if the given project task was completed ahead of schedule, contributing factors may indicate that materials for the given project task were delivered early or that labor resources for the given project task were increased. As another example, if the given project task was completed behind schedule, contributing factors may indicate that weather conditions caused work for the given project task to be delayed. As another example, data about contributing factors may comprise pre-processed raw text such as comments or notes explaining the contributing factors. Data regarding contributing factors may take other forms as well.

As yet another possibility, the historical construction project schedule data that is provided as input for training the LSTM model may also include dependency data for the given project task. Such dependency data may include (i) one or more completed tasks from which the given project task depends such that completion of those tasks is required for the given project task to commence and/or (ii) one or more tasks that are dependent on the given project task such that completion of the given project task is required for the dependent task(s) to commence.

Further, as yet another possibility, the historical construction project schedule data that is provided as input for training the LSTM model may also include a set of scheduling rules that define a general sequence of project phases, tasks, and work activities in which the work for the construction project should be completed. The scheduling rules may be based on industry conventions, for example, and may provide additional context for the LSTM model's evaluation of the received input. For instance, if the given project task is part of a given project phase, the LSTM model may eliminate from potential suggestions any tasks that do not fall within the sequence of work completion as defined by the scheduling rules. For example, based on the scheduling rules, the LSTM may determine that tasks which are part of a succeeding project phase that is dependent on completion of the given project phase could theoretically be commenced early, but that it is not practical to do so within the sequence of work completion. Thus, based on the scheduling rules, the LSTM may exclude outputting suggested updates involving those tasks. The historical construction project schedule data may include other types of data as well.

After receiving the input, the LSTM model may then perform an evaluation of the input in order to provide the output. The output that is provided by the LSTM model may comprise one or more suggested updates to the master schedule for the construction project, wherein each suggested update comprises (i) a project task that can be commenced earlier than a scheduled start date and (ii) a suggested new start date for the project task. During early stages of the training process, historical data that is available to the LSTM model may be limited, and the LSTM model may thus rely (heavily, and perhaps even exclusively) on the scheduling rules when evaluating the received input in order to output a suggestion. For example, the historical data may comprise an update that a given project task has been completed on time as part of a second phase of the construction project, and the historical data may include little or no dependency data or contributing factors data. Therefore, the LSTM model may output a suggested update to the master schedule based largely on the scheduling rules. For example, the suggested update may comprise a next upcoming task in the sequence of work completion.

The suggested update(s) output by the LSTM model may then be provided to a user (e.g., a general contractor) for review. For each suggested update, the user may then provide user input indicating whether to accept or reject the suggested update. When accepting the suggested update, the user may also confirm the suggested new start date or modify the suggested new start date to a different new start date. Data defining each schedule update may be stored by the back-end computing platform and used to create a profile of the master schedule of the construction project that comprises a snapshot of each successive schedule update made during the course of the construction project. The profile of the master schedule may then serve as part of the historical project schedule data that comprises the input for training the LSTM model. In this way, the LSTM model is further trained with each iteration of receiving input, evaluating the input, and yielding an output.

Moreover, this type of recurrent training of the LSTM model can advantageously embed industry knowledge and expertise into the model and thereby improve the suggested schedule updates that are presented to users. For example, each suggested schedule update may be associated with extensive project data indicating the type of task that is under consideration to pull up, the stage of the project, the size and scale of the project, the number of stakeholders involved, the location of the project where the work associated with the task will take place, etc. In this regard, the LSTM model may classify (e.g., via a clustering analysis) suggested schedule updates by their similarity to other suggested updates within the historical data. Based on this type of classification, the LSTM model may be able to identify that a certain type of suggested schedule update is frequently rejected by users, perhaps for situational reasons that are not captured in the general scheduling rules on which the LSTM model was initially seeded. Over time, the LSTM model may identify when similar schedule updates are possible, but may forgo suggesting such updates because of the low likelihood that they will be accepted. By the same token, acceptance of suggested updates can similarly reinforce the suggestion of similar updates in the future. Further, the LSTM model may identify that users elect to package certain types of updates together under certain conditions (but perhaps not other conditions). Thus, the LSTM model may suggest those types of updates as a package initially, allowing the user to separate them if desired. Numerous other examples are also possible.

The pull planning software engine 300 may utilize other types of machine learning models as well. For example, as another possibility, the predictive analytics sub-engine 304B may comprise a generative adversarial network (GAN) model that is trained using a neural network pair including a "generator" neural network and a "discriminator" neural network that iteratively generate and disqualify task suggestions. As yet another possibility, the predictive analytics sub-engine 304B may comprise a transformer model that is trained using an encoder-decoder architecture. Other types of machine learning models may also be utilized.

Other examples for training a machine learning model that is used by the pull planning software engine 300 to identify one or more tasks of a construction project for commencement earlier than scheduled are also possible. Further, the pull planning software engine 300 may utilize other types of predictive analytics in order to identify one or more tasks of a construction project for commencement earlier than scheduled as well.

The pull planning software engine 300 may be executed at various times. As one possibility, the pull planning software engine 300 may be run each time the back-end computing platform determines that the master schedule has been updated, which may take various forms. For example, the back-end computing platform may determine that the master schedule has been updated based on receiving, from a client station associated with a user, data defining an update to the master schedule for the construction project, as previously described.

As another example, the back-end computing platform may determine that the master schedule has been updated based on automatically updating data defining the master schedule. In this regard, the back-end computing platform may evaluate other available project data for the construction project and update the master schedule based on that evaluation. Such available project data may include image data, video data, audiovisual data, raw text data, and/or data associated with the construction project that is available to the back-end computing platform. Such project data may have been created using one or more other software tools of the software application that is being run by the back-end computing platform and that incorporates the pull planning software engine 300. Based on evaluating the other project data, the back-end computing platform may be able to make inferences about work progress for the construction project that may not be reflected in the master schedule. For instance, the project data may indicate that a given task has been completed, but the data defining the master schedule may indicate that the given task is still ongoing. To illustrate with an example, the data defining the master schedule may indicate that a concrete pour for the construction project is scheduled to occur during a given time period and complete on date Y. However, project data available on date X, which is earlier than date Y, may indicate that the concrete pour is complete. For example, image data may show that the concrete has been poured and/or observation data may indicate that a construction professional noticed that the concrete was poured. Therefore, based on evaluating the project data, the back-end computing platform may update the data defining the master schedule to indicate that the concrete pour has been completed on date X. The back-end computing platform may then run the pull planning software engine 300 to identify any other project tasks that can be commenced earlier than scheduled based on the concrete pour being completed earlier.

As another possibility of when the pull planning software engine 300 may be executed, the pull planning software engine 300 may run according to some predefined interval (e.g., once per day, once every hour, etc.). As yet another possibility, the pull planning software engine 300 may run each time a certain type of user input is detected. As one example, the user input may comprise a user request to access a particular software tool of the construction management software application incorporating the pull planning software engine 300 that may impact the master schedule (e.g., a software tool for creating and managing change events, a software tool for creating and managing RFIs, etc.). As another example, the user input may comprise a user request to access a schedule management tool of the construction management software application incorporating the pull planning software engine 300. Still further, as another possibility, the timing of the pull planning software engine 300 may depend on user information, such as user permissions (e.g., administrator-level permissions, etc.), user type (e.g., owner, GC, subcontractor, etc.), user affiliations (e.g., a type of contractor or a particular vendor with which the user is affiliated, such as a contractor responsible for electrical work, plumbing work, etc.), among other possibilities. For example, for a given type of user or for a user with a relatively higher permission level, the pull planning software engine 300 may be run each time the given user creates a new data item. As another example, for a given type of user or for a user with a relatively lower permission level, the pull planning software engine 300 may run at limited times or may not run at all based on actions of the user. In this regard, the user type and/or user permissions may dictate whether a given user is authorized to make updates to the master schedule and/or what tasks the given user is authorized to update. For instance, certain construction professionals may be responsible for managing different schedules for a construction project. For example, a user who is a superintendent of the construction project may be responsible for managing the master schedule and may also have access to manage more granular schedules such as look-ahead schedules for the entire project, whereas a user who is a foreman or a construction manager for a given subcontractor may be responsible for managing only look-ahead schedules within their scope of work responsibility and may be authorized to update the master schedule only insofar as it overlaps with their scope of work responsibility. Therefore, a given user's user type and/or user permissions may inform if and how often the pull planning software engine 300 runs.

The pull planning software engine 300 may also be run based on a combination of one or more of the above timings. The pull planning software engine 300 may be run at other times as well.

The pull planning software engine 300 may take various other forms as well.

b. Pull Planning Software Tool and GUI

According to a second aspect, the disclosed software technology comprises a software tool for managing schedules for a construction project that enables users to interact with tasks identified by the software engine for commencement earlier than scheduled and facilitate approval and coordination of earlier commencement of the identified tasks.

As mentioned above, the output 306 provided by the pull planning software engine 300 may take various forms. As one possibility, the output may comprise data that indicates (i) at least one task of the construction project that can be commenced earlier than a respective scheduled start date, (ii) a recommended new start date for the at least one identified task, (iii) a predicted impact on the master schedule if the at least one identified task is commenced on the new start date instead of the scheduled start date, and (iv) a party responsible for managing and completing the at least one identified task (e.g., the responsible contractor, etc.). The output may take other forms as well.

Based on the output 306 provided by the pull planning software engine 300, the back-end computing platform may perform certain actions. As one possibility, the back-end computing platform may cause the outputted data to be displayed to a user as a recommendation. In this regard, the back-end computing platform may cause the recommendation to be displayed to the user via a GUI of the software application incorporating the disclosed software technology and being run by the back-end computing platform that is presented to the user at a client station associated with the user and configured to communicate with the back-end computing platform (e.g., one of the client stations 112). The recommendation that is presented to the user may comprise (1) an identification of one or more tasks that can be commenced earlier than their respective start dates and (2) for each identified task, (i) an indication of its scheduled start date, (ii) an indication of a new start date that is earlier than the scheduled start date, and (iii) an indication of an impact on the master schedule if the identified task is commenced on the new start date instead of its scheduled start date.

The recommendation that is presented to the user may take various forms. As one possibility, the recommendation may take the form of a notification, such as a pop-up notification or a window overlay, that is presented to the user via a GUI displayed at a client station and indicates to the user that based on an update to the master schedule, one or more tasks can be commenced earlier than scheduled. In some instances, the notification may also include an indication of the update to the master schedule that initialized the recommendation.

The identification of the one or more tasks that is included in the recommendation may take various forms. As one possibility, the recommendation may include a selectable representation of each identified task or a selectable option (e.g., a respective checkbox) accompanying each identified task that can be selected to nominate that task for earlier commencement. Other examples are also possible.

The indication of the new start date for each identified task may take various forms. As one possibility, the indication may comprise a modifiable representation of the new start date whereby the user can propose an updated new start date on which the identified task should be commenced, which may be earlier than the scheduled start date of the identified task, but different from the new start date included in the recommendation. For example, the modifiable representation may be a selectable representation that comprises a date-input field that enables the user to enter a specific date and/or display a calendar view to select a given date on which the identified task should be commenced. Other examples are also possible.

The indication of the impact on the master schedule if each identified task is commenced on the new start date instead of its scheduled start date may take various forms. As one possibility, the indication may take the form of a percentage by which the master schedule would be pulled in if the identified task is commenced on the new start date. As another possibility, the indication may take the form of a number of days or an amount of time by which a scheduled task or milestone would be pulled in if the identified task is commenced on the new start date. As yet another possibility, the indication may be a combination of the above. Other examples are also possible. In instances where the user inputs an updated start date for an identified task as described above, the back-end computing platform may cause the indication of the impact to be updated based on the updated start date, thereby enabling the user to evaluate the impact of different start dates for a given identified task.

In instances where two or more tasks are identified for earlier commencement, the recommendation that is presented to the user may additionally include a priority indicator for each identified task that indicates an order of priority for earlier commencement of each task. The order of priority may be based on a comparison of a respective total amount of percentage and/or time that the master schedule would be pulled in if each identified task is commenced on its new start date. The priority indicator may take various forms. As one possibility, the priority indicator may take the form of a numerical rank that is assigned to each identified task in sequential order beginning from highest priority to lowest priority. In some instances, if it is determined that two or more identified tasks have a same priority, the respective priority indicators for each task may be the same. As another possibility, the priority indicator may take the form of a visual indicator, such as a color indicator, that represents a different color for different levels of priority (e.g., a first color indicating a high priority, a second color indicating a medium priority, and a third color indicating a low priority). The recommendation may further include an explanation of the priority indicator for each identified task. Other examples are also possible.

Still further, in instances where two or more tasks are identified for earlier commencement, and where the user has selected at least two tasks to nominate those tasks for earlier commencement, the recommendation may enable the user to indicate if the tasks are to be considered individually for earlier commencement or considered as a package for earlier commencement. In this regard, individual consideration of the tasks indicates that approval of earlier commencement for each task should be determined on a task-by-task basis, regardless of whether or not earlier commencement for any of the other nominated tasks is approved. Individual consideration of the tasks may be appropriate where the identified tasks are not dependent on each other. Package consideration of the identified tasks may be appropriate where one or more identified tasks are dependent on one another and approval or disapproval of one or more tasks is dependent on approval or disapproval of one or more other tasks.

To illustrate with an example, the identified tasks may include (i) a first task comprising painting for a first room and (ii) a second task comprising electrical installation for a second room. The user may select both the first and second tasks to be nominated for earlier commencement and may indicate that approval of earlier commencement for each task is to be considered individually. Thus, approval or disapproval of either one of the two tasks may be independent of approval or disapproval of the other task.

As another example, the identified tasks may include (i) a first task comprising electrical installation for a first room and (ii) a second task comprising drywall installation for the first room. The user may consider that electrical installation should be completed before drywall is installed, and that drywall installation should follow closely in time with the electrical installation. Thus, the user may select both the first and second tasks to be nominated for earlier commencement and may indicate that approval of earlier commencement of the first and second tasks should be considered as a package. In instances where tasks have been selected as a package nomination, the recommendation presented to the user may further include an option to indicate a particular sequence for the selected tasks based on which approval for earlier commencement of each task should be determined. For example, the selectable representations of each identified task may be re-ordered and placed in a particular listing order. As another example, the selectable options accompanying each identified task may include a text field whereby the user can numerically rank each identified task to dictate a sequence in which approval should be determined. Other examples are also possible.

In some instances, the selection of the identified tasks may include a combination of individual nomination(s) and package nomination(s). For example, the user may select three identified tasks for earlier commencement and further indicate that (i) approval of earlier commencement of the first task is to be determined individually and (ii) approval of earlier commencement of each of the second and third tasks is to be determined as a package. Other examples are also possible.

The recommendation that is presented to the user may additionally include a selectable option to confirm the input (e.g., selection of a task, modification of a start date) provided by the user. The selectable option to confirm the input may take the form of a GUI button, such as a "Save" or "Next" GUI button. The recommendation may additionally include a selectable option to clear any provided input, such as a "Clear" GUI button. Still further, the recommendation may include a selectable option to close the recommendation without selecting any identified tasks, such as an "X" or "Exit" GUI button.

After the user has completed selecting the identified task(s) which the user desires to nominate for earlier commencement and has selected the option to confirm the input, the back-end computing platform may receive, from the user's client station, data defining the input, which may include an indication of each selected identified task that was nominated for earlier commencement and an indication of an updated new date (if provided). Based on receiving the data defining the input, the back-end computing platform may take various actions to facilitate approval of the selected identified tasks.

For each identified task that was selected by the user, the back-end computing platform may cause a notification to be transmitted to a party responsible for completing the identified task. The responsible party may be, for example, a general contractor or subcontractor responsible for managing the identified task. In general, the notification may (i) indicate that the identified task has been nominated for commencement earlier than its scheduled start date, perhaps along with an indication of a new start date if applicable, and (ii) request approval from the responsible party for earlier commencement of the identified task on the new start date. In some implementations, the notification may additionally include an option to launch a schedule management tool whereby the responsible party can approve or deny the request. In other implementations, the notification may direct the responsible party to navigate to the schedule management tool in order to approve or deny the request. In some implementations, the responsible party may be able to propose an updated new start date before approving the request. In instances where the responsible party approves the request, the back-end computing platform may update the data defining the master schedule to reflect the new start date for the identified task. The back-end computing platform may additionally cause a notification indicating the approval to be transmitted to the user that nominated the identified task for earlier commencement. In instances where the responsible party denies the request, the back-end computing platform may cause a notification indicating the denial to be transmitted to the user that nominated the identified task for earlier commencement and may take no action to update the data defining the master schedule.

The notification that is transmitted to the party responsible for completing the identified task may take various forms. As one possibility, the notification may take the form of an email communication that is transmitted to the responsible party. As another possibility, the notification may take the form of a chat message (e.g., via Skype®, Slack®, etc.) or text message whereby the responsible party may provide a given response to indicate whether approval is accepted or denied. For example, the responsible party may receive a chat or text message (i) indicating that a given task has been nominated for commencement earlier than its scheduled start date along with an indication of a new start date, and (ii) requesting that the responsible party either approve or deny earlier commencement of the given task by inputting "Yes" or "Y" to approve earlier commencement or "No" or "N" to deny earlier commencement. For instance, the chat or text message may state: "Drywall can be started sooner on floor 3, North wing. Suggested earlier start date 4/1/2022, original start date 4/4/2022). It will save the master schedule by a total of 2 days. Do you have the crew, materials, equipment, and all other preparation to accept this suggestion? (Y, N, what else do you need to move the start date earlier)." Based on the input provided by the responsible party, the back-end computing platform may take further action. For example, if the input indicates approval, the back-end computing platform may update the start date of the given task. As another example, if the input indicates that additional information and/or actions are required to commence the given task earlier than schedule, the back-end computing platform may provide the additional information and/or facilitate the additional action(s). As yet another example, the notification may take the form of a message that can be accessed by the responsible party by accessing a particular software tool for managing communications. For example, the software application incorporating the disclosed technology may also include a software tool for managing messages, alerts, or other communications transmitted and/or received using the software application, and the notification may comprise one such message that the responsible party can access by navigating to a GUI view for the software tool for managing messages. Other examples are also possible.

In instances where two or more identified tasks were nominated as a package, the back-end computing platform may cause notifications to be transmitted in various ways. As one possibility, the back-end computing platform may cause a respective notification to be sent to the responsible party for each identified task in order of the particular sequence of tasks identified. For example, the back-end computing platform may cause a first notification to be transmitted to a first party responsible for completing the identified task that was indicated as a first task in the particular sequence for the selected tasks as identified by the user. If the first task is approved for earlier commencement, the back-end computing platform may then cause a second notification to be transmitted to a second party responsible for completing the next identified task in the particular sequence, and so forth. If earlier commencement of any one task in the package is denied, the back-end computing platform may (i) cease transmitting notifications to each responsible party, (ii) cause a notification indicating the denial to be transmitted to the user that nominated the identified tasks for earlier commencement, and (iii) take no action to update the data defining the master schedule.

As another possibility, the back-end computing platform may cause respective notifications requesting approval for the identified tasks to be sent concurrently to the respective responsible parties. After receiving an indication that each responsible party has responded to the request, the back-end computing platform may then determine if the requests as a package were either approved or denied. If the requests were approved, the back-end computing platform may update the data defining the master schedule to reflect the new start dates for the identified tasks and perhaps also cause a notification to be transmitted to the user indicating that the request for earlier commencement of the identified tasks was approved. However, if one or more of the requests were denied, the back-end computing platform may cause a notification indicating the denial(s) to be transmitted to the user that nominated the identified tasks for earlier commencement and take no action to update the data defining the master schedule.

In some instances, it is possible that one or more tasks that have been nominated for earlier commencement may pose a scheduling conflict with one or more other tasks of the construction project. As mentioned above, different users of the software application that is being run by the back-end computing platform may have different levels of authorization and/or different scopes of viewability with respect to the master schedule. For example, a first user who is a foreman during one phase of the construction project may be able to view/interact with a first section of the master schedule that pertains to the first user's respective scope of work, and a second user who is a foreman during another phase of the construction project may be able to view/interact with a second section of the master schedule that pertains to the second user's respective scope of work. Unbeknownst to each other, a first identified task nominated for earlier commencement by the first user may pose a scheduling conflict with a task within the second user's scope of work. In such instances, the back-end computing platform may determine that a scheduling conflict has arisen, and may thus cause a notification regarding the conflict to be transmitted to a user with more authority than both the first and second users (e.g., the superintendent) for resolution.

In some implementations, the disclosed software technology may enable a user to interact with a master schedule and/or a look-ahead schedule to input a request to pull-in a certain project task. For instance, the disclosed software tool for managing project schedules may include an option for a user to identify a given project task, input a target start date, and request an output of one or more other project tasks that would need to be pulled-in such that the given project task would be able to be commenced on the target start date.

Figure 4:
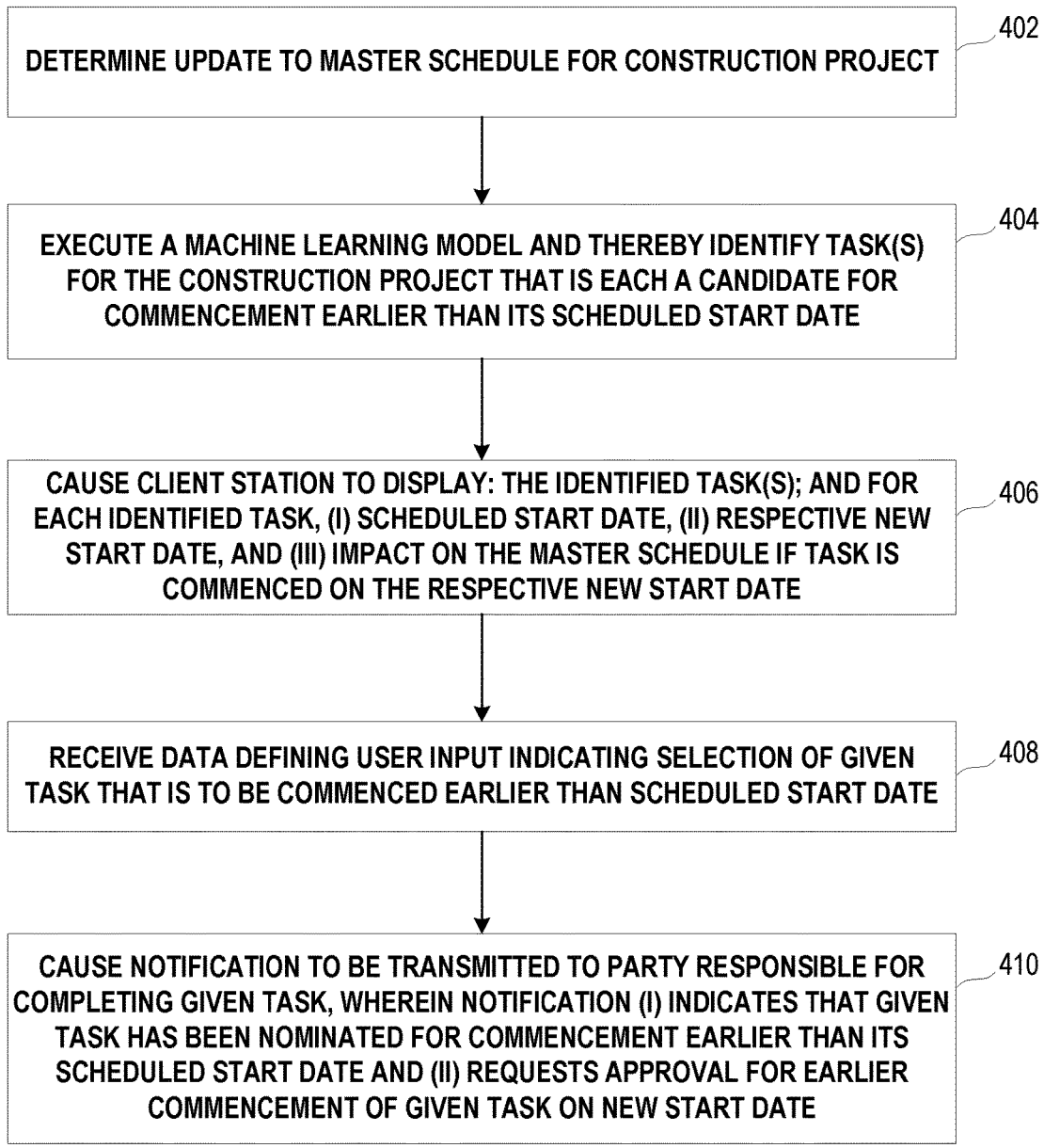
FIG. 4 depicts an example process for identifying tasks of a construction project that can be commenced earlier than scheduled.

Turning now to FIG. 4, a flow diagram of one example process for identifying tasks of a construction project that can be commenced earlier than scheduled in accordance with the software technology described herein is depicted. The example process 400 may be implemented by a back-end computing platform, such as the back-end computing platform 200. The example process 400 may include one or more operations, functions, or actions as illustrated by one or more of blocks 402-410. Although blocks 402-410 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the example process 400, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the example process 400, each block shown in FIG. 4 may represent circuitry that is wired to perform the specific logical functions in the process.

The example process may begin at block 402, where the back-end computing platform may determine that a master schedule for a construction project has been updated. The master schedule may comprise a plurality of tasks for the construction project, and each task may comprise a respective scheduled start date. As described above, the back-end computing platform may make the determination that the master schedule has been updated based on receiving data defining an update to the master schedule from a client station associated with a user or based on automatically updating data defining the master schedule.

Based on the update to the master schedule, at block 404, the back-end computing platform may execute a machine learning model and thereby identify one or more tasks for the construction project that is each a candidate for commencement earlier than its scheduled start date. As described above, the machine learning model may be trained with historical construction project schedule data relating to historical updates to one or more historical construction projects.

After identifying the one or more tasks, at block 406, the back-end computing platform may cause a client station associated with a user to display, via a graphical user interface view presented at the client station, (1) the one or more identified tasks and (2) for each identified task (i) its scheduled start date, (ii) a respective new start date that is earlier than the scheduled start date, and (iii) an impact on the master schedule if the task is commenced on the respective new start date instead of its scheduled start date. The GUI view presented at the client station may take various forms as previously described. In particular, the GUI view may include a selectable representation of the one or more identified tasks.

At block 408, the back-end computing platform may receive, from the client station, data defining user input that indicates a selection of a given one of the one or more identified tasks that is to be commenced earlier than its scheduled start date. Based on receiving the data defining the user input, the back-end computing platform may cause a notification to be transmitted to a party responsible for completing the given task, wherein the notification (i) indicates that the given task has been nominated for commencement earlier than its scheduled start date and (ii) requests approval for earlier commencement of the given task on the new start date.

In the ways described above, the disclosed software technology provides several improvements and advantages over existing technology for managing schedules related to construction projects. As one example, the disclosed software technology alleviates the burden for construction professionals to actively monitor progression of work throughout the course of a construction project in order to determine if and when project tasks can be commenced earlier in order to tighten up the master schedule. As another example, the disclosed software technology leverages access to available project data to automate scheduling updates and provide valuable insight regarding work progression of a construction project and recommendations in order to keep a construction project on or ahead of schedule. As yet another example, the disclosed software technology reduces the need for tedious, in-person congregations currently required for managing construction project schedules.

CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," "parties," or other entities, this is for purposes of example and explanation only. Claims should not be construed as requiring action by such actors unless explicitly recited in claim language.

The invention claimed is:

1. A computing system comprising:
a network interface;
at least one processor;
at least one non-transitory computer-readable medium; and
program instructions stored on the at least one non-transitory computer-readable medium that are executable by the at least one processor such that the computing system is configured to:
use one or more machine-learning processes to recurrently train a machine learning model for (i) identifying at least one task associated with a construction project that can be commenced earlier than its scheduled start date, and for the at least one identified task, (ii) recommending a new start date, and (iii) predicting a schedule impact on a master schedule of the construction project if the at least one identified task is commenced earlier than its scheduled start date, wherein the machine learning model is trained with historical construction project schedule data comprising historical schedule updates;
determine an update to a master schedule for a given construction project, wherein the master schedule for the given construction project comprises a plurality of tasks, each task comprising a respective scheduled start date;
evaluate data defining the update to the master schedule for the given construction project by executing the machine learning model and thereby (i) identify one or more candidate tasks for the given construction project that, as a result of the update, is each available to be nominated for commencement earlier than its scheduled start date, (ii) for each candidate task, recommend a new start date that is earlier than its schedules start date, and (iii) for each candidate task, predict a schedule impact on the master schedule for the given construction project if the candidate task is selected for commencement on its respective new start date;

cause a client station associated with a user to display:
the one or more candidate tasks; and
for each candidate task, (i) its scheduled start date, (ii) its respective new start date on which the candidate task is recommended to be commenced instead of its scheduled start date, and (iii) a predicted schedule impact on the master schedule if the candidate task is commenced on its respective new start date instead of its scheduled start date;

receive, from the client station, an indication of user input comprising a selection from the one or more candidate tasks of a given task that is to be commenced earlier than its scheduled start date; and based on the user input, generate a notification that is to be transmitted to a party responsible for completing the given task, wherein the notification (i) indicates that the given task has been nominated for commencement earlier than its scheduled start date and (ii) requests approval to schedule commencement of the given task on its respective new start date instead of its scheduled start date.

2. The computing system of claim 1, wherein the program instructions stored on the at least one non-transitory computer-readable medium that are executable by the at least one processor such that the computing system is configured to determine the update to the master schedule comprise program instructions stored on the at least one non-transitory computer-readable medium that are executable by the at least one processor such that the computing system is configured to:

receive, via a second client station associated with a second user, an indication of second user input indicating the update to the master schedule; and based on the second user input, update data defining the master schedule.

3. The computing system of claim 1, wherein the program instructions stored on the at least one non-transitory computer-readable medium that are executable by the at least one processor such that the computing system is configured to determine the update to the master schedule comprise program instructions stored on the at least one non-transitory computer-readable medium that are executable by the at least one processor such that the computing system is configured to:

based on available project data including one or more of textual data, image data, audiovisual data, task status data, or project phase data, determine that data defining the master schedule does not reflect one or more updates indicated by the available project data; and based on the determination, update the data defining the master schedule.

4. The computing system of claim 1, wherein the update to the master schedule comprises an identification of a completed task, and wherein each candidate task is directly or indirectly dependent on the completed task.

5. The computing system of claim 1, wherein the machine learning model is recurrently trained to:
receive, as input, historical construction project schedule data comprising (i) an update to a construction project schedule comprising completion of a given project task, (ii) dependency data for the given project task, and (iii) data about any contributing factors that led to the update; and based on the received input and historical construction project schedule data, output one or more recommended updates to the project schedule, wherein each recommended update comprises a project task that is available, as a result of the update, to be nominated for commencement earlier than a respective scheduled start date, wherein the historical construction project schedule data that is provided as input to the machine learning model is updated to include data defining any changes to the project schedule resulting from approval or denial of any recommended project tasks that have been selected to be nominated for earlier commencement.

6. The computing system of claim 1, further comprising program instructions stored on the at least one non-transitory computer-readable medium that are executable by the at least one processor such that the computing system is configured to:

receive an indication that the party responsible for completing the given task has approved scheduling earlier commencement of the given task on its respective new start date instead of its scheduled start date; and update the data defining the master schedule to replace the scheduled start date for the given task with its respective new start date, such that the new start date for the given task becomes the scheduled start date.

7. The computing system of claim 1, wherein,
the given task is a first task;
the user input further indicates selection of a second task that is to be commenced earlier than its scheduled start date;
the notification is a first notification;
the party responsible for completing the first task is a first party; and
the computing system further comprises program instructions stored on the at least one non-transitory computer-readable medium that are executable by the at least one processor such that the computing system is configured to:
generate a second notification that is to be transmitted to a second party responsible for completing the second task that (i) indicates that the second task has been nominated for commencement earlier than its respective scheduled start date and (ii) requests approval to schedule commencement of the second task on a respective new start date instead of its respective scheduled start date.

8. The computing system of claim 7, further comprising program instructions stored on the at least one non-transitory computer-readable medium that are executable by the at least one processor such that the computing system is configured to:

receive indications that both the first and second parties have approved earlier commencement of the first and second tasks, respectively; and update the data defining the master schedule to indicate that the respective scheduled start dates for the first and second tasks have changed to their respective new start dates.

9. The computing system of claim 7, further comprising program instructions stored on the at least one non-transitory computer-readable medium that are executable by the at least one processor such that the computing system is configured to:
  receive an indication that earlier commencement of the first task was denied; and
  based on the indication, determine that neither of the first or second tasks is to be scheduled for earlier commencement.

10. The computing system of claim 9, further comprising program instructions stored on the at least one non-transitory computer-readable medium that are executable by the at least one processor such that the computing system is configured to:
  determine that the first task for which earlier commencement was denied involves a dependency for the second task such that the first task must be completed prior to the second task being commenced.

11. The computing system of claim 7, further comprising program instructions stored on the at least one non-transitory computer-readable medium that are executable by the at least one processor such that the computing system is configured to:
  receive a first indication that earlier commencement of the first task was denied;
  receive a second indication that earlier commencement of the second task was approved;
  based on the first and second indications, determine that (i) the first task is not to be scheduled for earlier commencement and (ii) the second task is to be scheduled for earlier commencement; and
  update the data defining the master schedule to indicate the respective new start date for the second task.

12. A non-transitory computer-readable medium, wherein the non-transitory computer-readable medium is provisioned with program instructions that, when executed by at least one processor, cause a computing system to:
  use one or more machine-learning processes to recurrently train a machine learning model for (i) identifying at least one task associated with a construction project that can be commenced earlier than its scheduled start date, and for the at least one identified task, (ii) recommending a new start date, and (ii) predicting a schedule impact on a master schedule of the construction project if the at least one identified task is commenced earlier than its scheduled start data, wherein the machine learning model is trained with historical construction project schedule data comprising historical schedule updates;
  determine an update to a master schedule for a given construction project, wherein the master schedule for be given construction project comprises a plurality of tasks, each task comprising a respective scheduled start date;
  evaluate data defining the update to the master schedule for the given Construction project by executing the machine learning model and thereby (i) identify one or more candidate tasks for the given construction project that, as a result of the update, is each available to be nominated for commencement earlier than its scheduled start date, (ii) for each candidate task, recommend a new start late that is earlier than its scheduled start date, and (iii) for each candidate task, predict a schedule impact on the master schedule for the given construction project if the candidate task is selected for commencement of respective new start date;
  cause a client station associated with a user to display:
    the one or more candidate tasks; and
    for each candidate task, (i) its scheduled start date, (ii) its respective new start date on which the candidate task is recommended to be commenced instead of its scheduled start date, and (iii) a predicted schedule impact on the master schedule if the candidate task is commenced on its respective new start date instead of its scheduled start date;
  receive, from the client station, an indication of user input comprising a selection from the one or more candidate tasks of a given task that is to be commenced earlier than its scheduled start date; and
  based on the user input, generate a notification that is to be transmitted to a party responsible for completing the given task, wherein the notification (i) indicates that the given task has been nominated for commencement earlier than its scheduled start date and (ii) requests approval to schedule commencement of the given task on its respective new start date instead of its scheduled start date.

13. The non-transitory computer-readable medium of claim 12, wherein the program instructions that, when executed by the at least one processor, cause the computing system to determine the update to the master schedule comprise program instructions that, when executed by the at least one processor, cause the computing system to:
  receive, via a second client station associated with a second user, an indication of second user input indicating the update to the master schedule; and
  based on the second user input, update data defining the master schedule.

14. The non-transitory computer-readable medium of claim 12, wherein the program instructions that, when executed by the at least one processor, cause the computing system to determine the update to the master schedule comprise program instructions stored on the non-transitory computer-readable medium that, when executed by the at least one processor, cause the computing system to:
  based on available project data including one or more of textual data, image data, audiovisual data, task status data, or project phase data, determine that data defining the master schedule does not reflect one or more updates indicated by the available project data; and
  based on the determination, update the data defining the master schedule.

15. The non-transitory computer-readable medium of claim 12, wherein the update to the master schedule comprises an identification of a completed task, and wherein each candidate task is directly or indirectly dependent on the completed task.

16. The non-transitory computer-readable medium of claim 12, wherein the machine learning model is recurrently trained to:
  receive, as input, historical construction project schedule data comprising (i) an update to a construction project schedule comprising completion of a given project task, (ii) dependency data for the given project task, and (iii) data about any contributing factors that led to the update; and
  based on the received input and historical construction project schedule data, output one or more recommended updates to the project schedule, wherein each recommended update comprises a project task that is available, as a result of the update, to be nominated for commencement earlier than a respective scheduled start date,
  wherein the historical construction project schedule data that is provided as input to the machine learning model is updated to include data defining any changes to the project schedule resulting from approval or denial of any recommended project tasks that have been selected to be nominated for earlier commencement.

17. The non-transitory computer-readable medium of claim 12, wherein the non-transitory computer-readable medium is also provisioned with program instructions that, when executed by the at least one processor, cause the computing system to:
receive an indication that the party responsible for completing the given task has approved scheduling earlier commencement of the given task on its respective new start date instead of its scheduled start date; and
update the data defining the master schedule to replace the scheduled start date for the given task with its respective new start date, such that the new start date for the given task becomes the scheduled start date.

18. A method carried out by a computing system, the method comprising:
using one of more machine-learning processes to recurrently train a machine learning model for (i) identifying at least one task associated with a construction project that can be commenced earlier than its scheduled start date, and for the at least one identified task, (ii) recommending a new start date, and (iii) predicting a schedule impact on a master schedule of the construction project if the at least one identified task is commenced earlier than its scheduled start date, wherein the machine learning model is trained with historical construction project schedule data comprising historical schedule updates;
determining an update to a master schedule for a given construction project, wherein the master schedule for the given construction project comprises a plurality of tasks, each task comprising a respective scheduled start date;
evaluating data defining the update to the master schedule for the given construction project by executing the machine learning model and thereby (i) identify one or more candidate tasks for the given construction project that, as a result of the update, is each available to be nominated for commencement earlier than its scheduled start date, (ii) for each candidate task, recommend a new start date that is earlier than its scheduled start date, and (iii) for each candidate task, predict a schedule impact on the master schedule for the given construction project if the candidate task is selected for commencement on its respective new start date;
causing a client station associated with a user to display:
the one or more candidate tasks; and
for each candidate task, (i) its scheduled start date, (ii) its respective new start date on which the candidate task is recommended to be commenced instead of its scheduled start date, and (iii) a predicted schedule impact on the master schedule if the candidate task is commenced on its respective new start date instead of its scheduled start date;
receiving, from the client station, an indication of user input comprising a selection from the one or more candidate tasks of a given task that is to be commenced earlier than its scheduled start date; and
based on the user input, generating a notification that is to be transmitted to a party responsible for completing the given task, wherein the notification (i) indicates that the given task has been nominated for commencement earlier than its scheduled start date and (ii) requests approval to schedule commencement of the given task on its respective new start date instead of its scheduled start date.

19. The method of claim 18, wherein determining the update to the master schedule comprises:
receiving, via a second client station associated with a second user, an indication of second user input indicating the update to the master schedule; and
based on the second user input, updating data defining the master schedule.

20. The method of claim 18, wherein determining the update to the master schedule comprises:
based on available project data including one or more of textual data, image data, audiovisual data, task status data, or project phase data, determining that data defining the master schedule does not reflect one or more updates indicated by the available project data; and
based on the determination, updating the data defining the master schedule.

* * * * *